(12) United States Patent
Hong et al.

(10) Patent No.: US 12,496,788 B2
(45) Date of Patent: Dec. 16, 2025

(54) SEALANT BOTTLE

(71) Applicant: ACTIVE TOOLS INTERNATIONAL (HK) LTD., Causeway Bay (CN)

(72) Inventors: Jui Hung Wesley Hong, Causeway Bay (CN); Koon Fung Lam, Causeway Bay (CN); Wai Kwong Ching, Causeway Bay (CN); Shixiong Luo, Causeway Bay (CN)

(73) Assignee: ACTIVE TOOLS INTERNATIONAL (HK) LTD., Causeway Bay (HK)

( * ) Notice: Subject to any disclaimer, the term of this patent is extended or adjusted under 35 U.S.C. 154(b) by 203 days.

(21) Appl. No.: 18/015,124

(22) PCT Filed: Jul. 9, 2020

(86) PCT No.: PCT/CN2020/101020
§ 371 (c)(1),
(2) Date: Jan. 9, 2023

(87) PCT Pub. No.: WO2022/006805
PCT Pub. Date: Jan. 13, 2022

(65) Prior Publication Data
US 2023/0256691 A1    Aug. 17, 2023

(51) Int. Cl.
*B29C 73/02* (2006.01)
*F16K 31/12* (2006.01)

(52) U.S. Cl.
CPC ............ *B29C 73/025* (2013.01); *F16K 31/12* (2013.01)

(58) Field of Classification Search
CPC ... B29C 73/166; B29C 73/025; B01F 23/235; B05B 7/0018–0043; A47K 5/14–16; A45D 27/10
See application file for complete search history.

(56) References Cited

U.S. PATENT DOCUMENTS 1,888,768 A * 11/1932 Lach ...................... A45D 27/10
222/400.8
1,919,257 A * 7/1933 Renzenhausen ..... A47K 5/1211
222/394

(Continued)

FOREIGN PATENT DOCUMENTS

CN          20402148 U      12/2014
CN         104629682 A       5/2015
(Continued)

OTHER PUBLICATIONS

European Patent Application No. 20944111.2, Extended European Search Report, dated Mar. 25, 2024.
(Continued)

*Primary Examiner* — Paul R Durand
*Assistant Examiner* — Randall A Gruby
(74) *Attorney, Agent, or Firm* — MARSHALL, GERSTEIN & BORUN LLP

(57) ABSTRACT

The present application discloses a sealant bottle, which comprises: a bottle body defining an internal space for storing sealant and having: a gas inlet in fluid communication with the internal space to allow gas to enter the internal space; a pipe for receiving the sealant, at least a portion of which is arranged in the internal space to allow the sealant to enter the pipe; and a sealant outlet communicated with the pipe; wherein the pipe defines a sealant delivery path to the sealant outlet, the pipe is further provided with a gas lead-in part on the sealant delivery path, and the gas lead-in part is configured such that the gas from the internal space enters the pipe through the gas lead-in part to mix with the sealant on the sealant delivery path.

8 Claims, 3 Drawing Sheets

(56) References Cited

U.S. PATENT DOCUMENTS

| | | | | |
|---|---|---|---|---|
| 2,119,906 A * | 6/1938 | Dorman | ............... | A47J 43/121 261/DIG. 26 |
| 2,153,156 A * | 4/1939 | Pollnow | ............... | A47K 5/1211 222/400.7 |
| 2,315,263 A * | 3/1943 | Lindsay | ............... | A62C 13/003 169/72 |
| 2,653,848 A * | 9/1953 | Lee | ............... | A47L 11/325 222/401 |
| 2,680,010 A * | 6/1954 | Dubay | ............... | B05B 7/0037 261/124 |
| 2,981,444 A * | 4/1961 | Root | ............... | B65D 47/147 222/215 |
| 3,260,421 A * | 7/1966 | Rabussier | ............... | B65D 83/32 222/464.2 |
| 3,709,437 A * | 1/1973 | Wright | ............... | B65D 83/771 239/303 |
| 4,019,661 A * | 4/1977 | Szabo | ............... | B05B 11/0059 222/376 |
| 4,027,789 A * | 6/1977 | Dickey | ............... | B05B 11/043 222/211 |
| 4,091,966 A * | 5/1978 | Laauwe | ............... | B05B 11/045 222/211 |
| 4,155,509 A * | 5/1979 | Koyama | ............... | B65D 83/60 222/399 |
| 4,629,098 A * | 12/1986 | Eger | ............... | A45F 5/00 222/530 |
| 4,901,925 A * | 2/1990 | Blake, III | ............... | B05B 7/0037 239/371 |
| RE33,564 E * | 4/1991 | Ford, Jr. | ............... | A47K 5/14 222/401 |
| 5,037,006 A * | 8/1991 | Kock | ............... | B05B 7/0037 222/211 |
| 5,222,633 A * | 6/1993 | Blake | ............... | B01F 25/3121 222/400.8 |
| 5,310,093 A * | 5/1994 | Bennett | ............... | B05B 7/0018 239/590.5 |
| 5,411,177 A * | 5/1995 | Blake, III | ............... | B01F 25/3121 222/105 |
| 5,842,607 A * | 12/1998 | Snider | ............... | B05B 7/0037 222/401 |
| 6,371,332 B1 * | 4/2002 | Fox | ............... | B05B 11/06 222/190 |
| 6,810,795 B1 * | 11/2004 | Hsu | ............... | A47J 31/4485 99/452 |
| 7,416,327 B2 * | 8/2008 | Ghidini | ............... | A47J 43/1081 366/256 |
| 7,690,536 B2 * | 4/2010 | Briozzo Fernandez | ............... | B05B 11/043 222/211 |
| 7,854,242 B2 * | 12/2010 | Stehle | ............... | B29C 73/166 141/38 |
| 8,056,769 B2 * | 11/2011 | van der Heijden | ... | B05B 7/0025 222/211 |
| 8,205,645 B2 * | 6/2012 | Dowel | ............... | B29C 73/166 141/38 |
| 8,590,811 B2 * | 11/2013 | Poizot | ............... | B05B 11/1023 222/402.18 |
| 8,622,252 B2 * | 1/2014 | Kerr | ............... | A61K 8/046 222/321.9 |
| 9,050,866 B2 * | 6/2015 | Hong | ............... | B60C 25/16 |
| 9,492,976 B2 * | 11/2016 | Hong | ............... | B29C 73/166 |
| 9,682,520 B2 * | 6/2017 | Chou | ............... | B05B 7/2491 |
| 9,718,070 B2 * | 8/2017 | Arminak | ............... | B05B 11/0032 |
| 10,226,779 B2 * | 3/2019 | Loiti Urquia | ......... | B05B 7/2467 |
| 10,781,032 B2 * | 9/2020 | Chou | ............... | B65D 83/00 |
| 11,077,412 B2 * | 8/2021 | Nicmanis | ............... | B05B 7/0483 |
| 11,260,355 B2 * | 3/2022 | King | ............... | B01F 23/235 |
| 2009/0107578 A1 * | 4/2009 | Trachtenberg | ........ | B05B 9/0805 141/38 |
| 2010/0126523 A1 * | 5/2010 | Fujinuma | ............... | A61K 8/22 222/106 |
| 2015/0202645 A1 * | 7/2015 | Tepas | ............... | B05B 11/1001 222/190 |
| 2015/0360853 A1 * | 12/2015 | Nicmanis | ............... | B65D 83/32 222/1 |
| 2016/0121563 A1 * | 5/2016 | Chou | ............... | B29C 73/166 141/38 |
| 2019/0337247 A1 * | 11/2019 | Dowel | ............... | B29C 73/166 |
| 2019/0344954 A1 * | 11/2019 | Chou | ............... | B65D 85/00 |

FOREIGN PATENT DOCUMENTS

| | | |
|---|---|---|
| CN | 110418676 A | 11/2019 |
| CN | 210187608 U | 3/2020 |
| CN | 210527275 U | 5/2020 |
| DE | 102006059479 A1 | 8/2007 |
| JP | H08159015 A | 6/1996 |
| JP | 4666613 B2 | 4/2011 |
| JP | 2016504971 A | 2/2016 |
| JP | 2020500756 A | 1/2020 |
| JP | 2020512192 A | 4/2020 |
| WO | WO-2009052576 A1 | 4/2009 |

OTHER PUBLICATIONS

Notice of Reasons for Refusal for Japanese Patent Application No. 2023-501537, dated Mar. 26, 2024.
International Application No. PCT/CN2020/101020, International Search Report, dated Mar. 29, 2021.
Notice of Reasons for Refusal for Japanese Application No. 2023-501537, dated Sep. 27, 2024.
Korean Patent Application No. 20237004246, Office Action, mailed Jan. 21, 2025.

\* cited by examiner

SEALANT BOTTLE

TECHNICAL FIELD

The present application relates to the technical field of automobile maintenance tools, in particular to a sealant bottle.

BACKGROUND

When a car is running, the tire will sometimes have abnormal conditions, such as out of gas, damage, and the like. In this case, a spare tire is usually used to replace the tire that is out of gas or damaged, or a rapid tire repair and inflation is provided to the tire.

Currently, a pneumatic tire is used in cars. When the tire is punctured, the tire does not need to be replaced. The punctured part of the tire is repaired by injecting sealant into the tire.

The sealant is a polymer compound, which is generally in liquid state and stored in a sealant bottle. During a tire repair process as mentioned above, air is first pumped into the sealant bottle, and then the sealant in the bottle is pumped out and continues to be pumped into the tire. When entering the tire, the sealant strikes and mixes with the surrounding air, and its volume increases to be in the form of foams. After the foaming sealant enters the tire, it can reach the punctured part and cover the inner wall of the tire to form a sealing film. It is ideal to use less sealant for tire repair.

JP4666613B2 discloses a sealant injection device, which comprises a reservoir for storing sealant and a mixing part outside the reservoir. Air enters the reservoir and the mixing part respectively through two branch lines. The air entering the reservoir presses the sealant into the mixing part, and the sealant pressed into the mixing part mixes with the air that directly enters the mixing part. The mixed sealant is then output to the tire and injected into the tire through a tire valve core. A valve is arranged at the beginning end of the divergence of the two branch lines to distribute the air flow to the respective branch lines. To this end, the injection device of JP4666613B2 is further provided with a controller for manual or automatic control.

SUMMARY

One aspect of the present application is to provide a sealant bottle, which comprises: a bottle body defining an internal space for storing sealant and having a gas inlet in fluid communication with the internal space to allow gas to enter the internal space; a pipe for receiving the sealant, at least a portion of which is arranged in the internal space; and a sealant outlet communicated with the pipe; wherein the pipe defines a sealant delivery path to the sealant outlet, the pipe is further provided with a gas lead-in part on the sealant delivery path, and the gas lead-in part is configured such that gas from the internal space enters the pipe through the gas lead-in part to mix with the sealant on the sealant delivery path.

In an embodiment of the sealant bottle, the bottle body comprises a container and a cover in sealed connection with the container, wherein the gas lead-in part is arranged on one portion of the pipe inside the container and/or on another portion of the pipe inside the cover.

In an embodiment of the sealant bottle, the gas lead-in part comprises at least one eyelet arranged on the pipe and communicated with and between the internal space and inside of the pipe.

In an embodiment of the sealant bottle, the pipe has a sealant-passage section, and the at least one eyelet has a gas-passage section. The ratio of the area of the sealant-passage section to the sum of the area of the gas-passage section of the at least one eyelet is in the range of 8-89.

In an embodiment of the sealant bottle, the ratio of the area of the sealant-passage section to the sum of the area of the gas-passage section of the at least one eyelet is in the range of 32-89.

In an embodiment of the sealant bottle, when the at least one eyelet comprises one eyelet, the one eyelet is arranged on a circumferential side of the pipe; when the at least one eyelet comprises two eyelets, the two eyelets are respectively arranged on opposite circumferential sides of the pipe; when the at least one eyelet comprises more eyelets, the more eyelets are arranged around the pipe.

In an embodiment of the sealant bottle, the gas inlet and the sealant outlet are arranged on the cover, or the gas inlet is arranged on the container and the sealant outlet is arranged on the cover.

In an embodiment of the sealant bottle, the one portion of the pipe inside the container is a pipe made of flexible material, and the pipe is provided with a sealant receiver at the bottom of the bottle body to allow the sealant to enter the pipe from the bottom.

In an embodiment of the sealant bottle, the sealant bottle further comprises a feeding tube outside the bottle body, wherein the feeding tube is connected to the sealant outlet.

In the present application, sealant and gas can be mixed in the sealant bottle. The mixture of the sealant and gas is carried out through the gas lead-in part. It is found that this early and active mixing can make the volume of the sealant much larger than that of the sealant mixed at the tire or in other ways. For example, the mixture of sealant and the surrounding air at the tire can increase the volume by 30-40%. For another example, the volume can be increased by less than 10% by shaking the sealant bottle for mixing, or by mixing the sealant and the air that then presses the mixed sealant into a pipe in the bottle. In contrast, the present application can increase the volume by more than above values, and even up to more than 100%. Therefore, the sealant bottle according to the present application can turn the sealant into foam already when it reaches the injection port of the tire (usually a valve core), and the amount of the foam is considerable. Accordingly, on the other hand, it can reduce the amount of sealant used and improve the efficiency of tire repair.

The present application is both simple in structure and reliable. After the gas is pumped into the sealant bottle, the gas haing a high pressure in the sealant bottle can push the sealant into the pipe on the one hand, and can enter the pipe through the gas lead-in part on the pipe to meet and mix with the sealant during the delivery of the sealant on the other hand. Because mixing takes place in the pipe, there is no need to install additional pneumatic devices, or additional mixing components, or additional pressure control components, in the sealant bottle. Therefore, the present application has the advantages of low cost and easy manufacturing.

Other aspects and features of the present application become apparent from the following detailed description with reference to the accompanying drawings. However, it should be appreciated that the drawings are designed only for the purpose of explanation, but are not to limit the scope of the present application, which should refer to the appended claims. It should also be appreciated that the drawings are intended only to conceptually illustrate the structure and process described herein, and unless otherwise specified, it is not necessary to draw the drawings to scale.

BRIEF DESCRIPTION OF THE DRAWINGS

The present application will be more fully understood by referring to the following detailed description of specific embodiments in combination with the drawings. The same reference numerals always denote the same elements in the drawings, where.

DETAILED DESCRIPTION

In order to help those skilled in the art to accurately understand the subject matter claimed in the present application, the specific embodiments of the present application are described in detail below in conjunction with the accompanying drawings.

Figure 1:
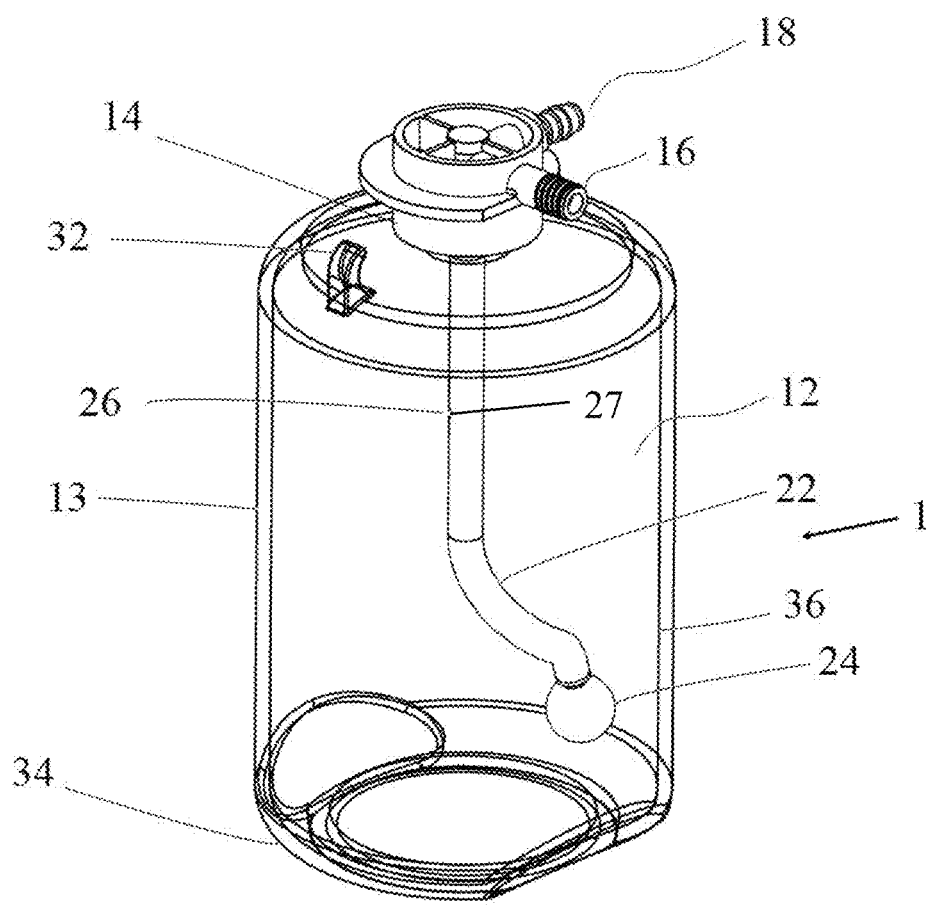
FIG. 1 is a schematic diagram of an embodiment of the sealant bottle according to the present application.

FIG. 1 is a schematic diagram of an embodiment of the sealant bottle according to the present application. For clear illustration, the bottle is drawn to be transparent so that its internal structure can be seen. The sealant bottle comprises a bottle body 1, which defines the inside of the bottle and provides an internal space 12 for storage of the sealant. The bottle body 1 has at least an inlet 16 and an outlet 18. As shown in the figure, the inlet 16 and the outlet 18 are respectively ports protruding outward from the top of the bottle, which can be connected with other objects such as tubes. The inlet 16 is used for passage of the gas, so it is a gas inlet. The gas inlet 16 is communicated with the internal space 12 at the inside of the bottle body, so that the gas can enter the internal space 12 through the gas inlet 16.

The bottle body 1 further has a pipe 22 inside it, which is used to receive the sealant. The pipe 22 defines a sealant delivery path and is communicated with the outlet 18, so that the sealant can be delivered to the outlet 18. Therefore, the outlet is a sealant outlet. The shape of the pipe 22 determines the sealant delivery path. As shown in the figure, the pipe 22 can be bent, and its beginning end is positioned against the wall 36 of the internal space 12. The beginning end of the pipe 22 is close to the bottom 34 of the bottle body 1, and is roughly between the bottom 34 of the bottle body 1 and the wall 36 of the internal space 12. The sealant can enter the pipe 22 from the bottom 34 of the bottle body 1. Specifically, it enters the pipe through the beginning end of the pipe 22. In the embodiment shown in the figure, a sealant receiver 24 is arranged at the beginning end of the pipe 22 to help more sealant to enter the pipe 22. The sealant receiver 24 can be a one-way valve, which only allows the sealant to enter the pipe 22 from the internal space 12, but does not allow reverse flow. The sealant receiver 24 can also be a positioning device to assist the beginning end of the pipe to position against the wall 36 of the internal space 12. These configurations help the sealant to enter the pipe 22. In addition, the shape of the sealant receiving part 24 is not limited to the form shown in the figure.

Further, the pipe 22 is provided with a gas lead-in part 26, which is on the sealant delivery path. The gas from the internal space 12 enters the pipe 22 through the gas lead-in part 26 and mixes with the sealant on the sealant delivery path.

Here, "on the sealant delivery path" can also be along the sealant delivery path. During the delivery of the sealant, the gas permeates, mixes with the sealant and flows to the outlet.

The arrangement of the gas lead-in part 26 provides the possibility of premixing the sealant. The gas is pumped into the bottle body 1, and a certain pressure is accumulated in the internal space 12, so that the air is pressed into the pipe 22 through the gas lead-in part 26. This manner of providing gas in an active manner not only increases the amount of air involved in mixing, but also omits additional pneumatic devices. In the embodiment shown in FIGS. 2-3, the double-line arrows represent the path of the gas, and the solid arrows represent the path of the sealant. When the sealant reaches the injection port of the tire, a second mixing will occur.

Figure 2:
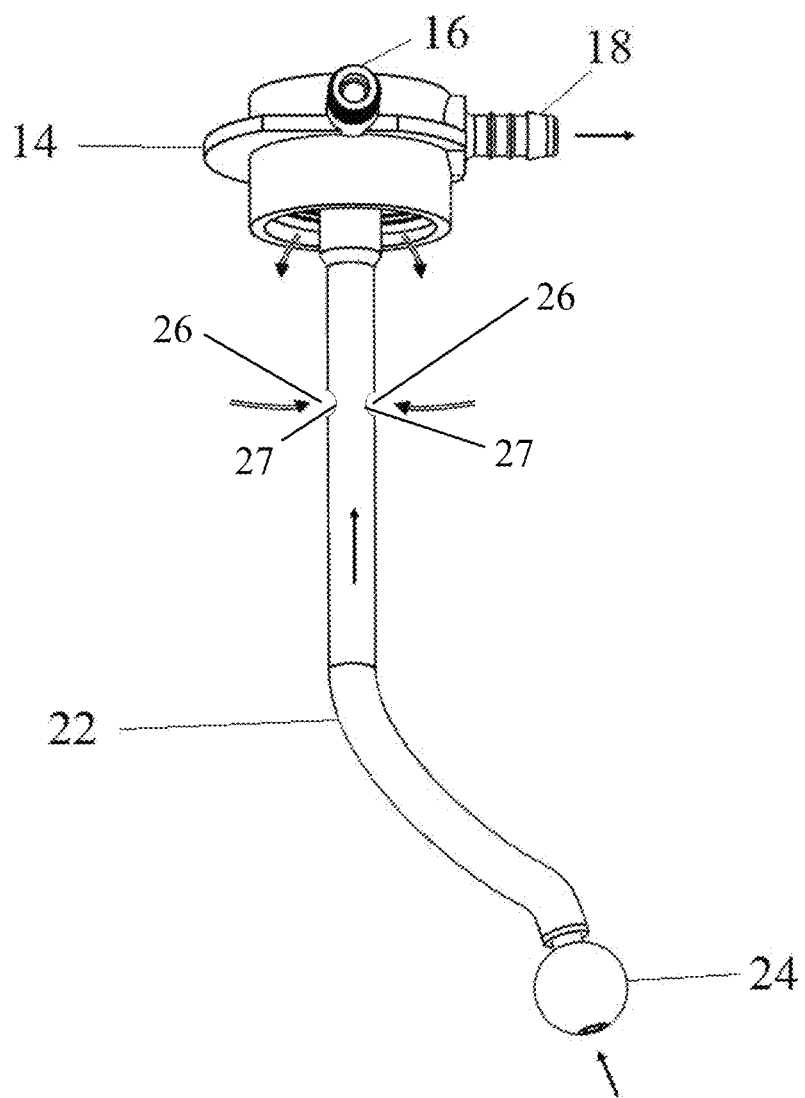
FIG. 2 is a schematic diagram of the sealant bottle after the container is removed according to the present application.
Figure 3:
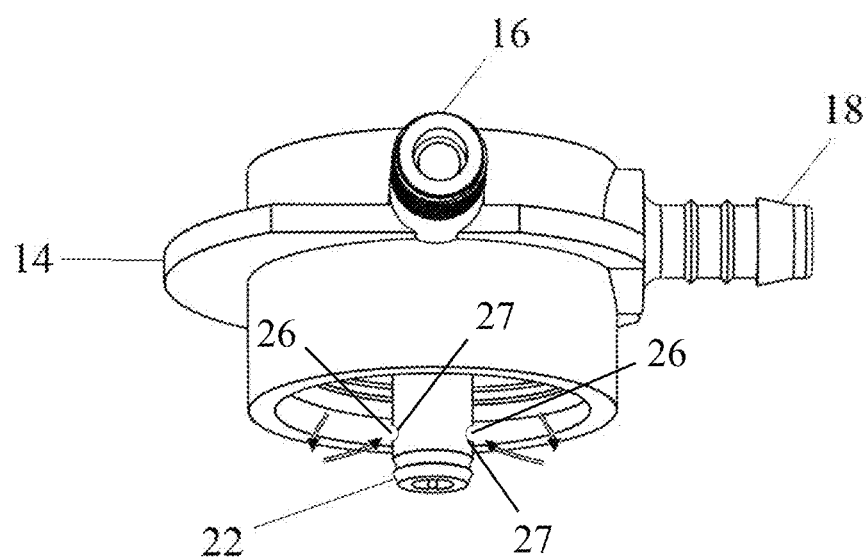
FIG. 3 is a schematic diagram of an embodiment of the cover of the sealant bottle according to the present application.

Referring again to FIG. 1, the bottle body 1 comprises a container 13 and a cover 14, which are connected in a sealed manner. The gas inlet 16 and the sealant outlet 18 are arranged on and integrated with the cover 14. The pipe 22 comprises at least one section inside the container 13 and another section inside the cover 14. The section of the pipe 22 inside the container 13 can be a pipe made of flexible material, such as a hose, so that the pipe 22 can be bent, while the another section is integrated with the cover 14. The gas lead-in part 26 can be arranged on the hose as shown in FIG. 2, or on the cover as shown in FIG. 3. In these embodiments, the outer side of the pipe 22 can contact with gas to facilitate gas entry. The sealant can occupy at least part of the internal space 12. In general, the height of the gas lead-in part 26 in the bottle body 1 can be greater than the initial liquid level of the sealant, thus allowing only gas to enter the gas lead-in part 26, thereby achieving a better premixing effect.

Still further, the gas lead-in part 26 comprises at least one eyelet 27, which communicates with and between the internal space 12 and the interior of the pipe 22. There can be one eyelet 27, or there can be two eyelets 27 as shown in FIGS. 2-3 (seen from FIGS. 2-3, it can be seen that there are two eyelets 27 according to the arrows indicating gas flow). When there is one eyelet 27, it is arranged on one circumferential side of the pipe. When there are two eyelets 27, they are respectively arranged on opposite circumferential sides of the pipe 22. It should be appreciated that there can also be more eyelets 27 arranged around the pipe 22. When there are multiple eyelets 27, they can be arranged symmetrically or asymmetrically. The asymmetric arrangement can lead the gas into the pipe 22 in a balanced manner, because the sealant bottle is often inclined during use.

The eyelet 27 has a gas-passage section, i.e., the size of the eyelet. The pipe 22 has a sealant-passage section, i.e., the cross section of the pipe 22. The size of the eyelet 27 can be configured such that the ratio of the area of the sealant-passage section to the sum of the area of the gas-passage section is in the range of 8-89, preferably in the range of 32-89. Table 1 shows a plurality of sets of experimental data, where two eyelets 27 are arranged. The gas-passage section of the eyelet 27 depends on the diameter of the eyelet 27, which varies from 0 to 2 mm. When the size of the eyelet 27 is 0, it can be considered that there is no gas lead-in part on the pipe 22. The size of the pipe 22 is unchanged along its entire length, with a diameter of 4 mm and an area of sealant-passage section of 12.57 mm$^2$. It can be seen that when the ratio of the area of the sealant-passage section to the sum of the areas of the gas-passage sections is in the range of 8-89, the volume of the sealant after mixing will increase compared with the volume of the sealant before mixing. In particular, when the ratio of the above areas is in the range of 32-89, the volume of the sealant after mixing can increase to more than twice. This indicates that a large amount of sealant foam for tire repair is generated. It can also be seen that when the size of the eyelet 27 is too large, the amount of sealant foam generated will be affected.

TABLE 1

| Pipe diameter (mm) | Eyelet diameter (mm) | Area of sealant-passage section (mm²) | Total area of gas-passage sections (mm²) | Area of sealant-passage section/ total area of gas-passage sections (area ratio) | Volume expansion coefficient |
|---|---|---|---|---|---|
| 4 | 0 | 12.57 | 0 | N/A | 1.4 |
| 4 | 0.3 | 12.57 | 0.14 | 89 | 2.3 |
| 4 | 0.5 | 12.57 | 0.39 | 32 | 2.3 |
| 4 | 0.8 | 12.57 | 1.01 | 13 | 1.7 |
| 4 | 1 | 12.57 | 1.57 | 8 | 1.6 |
| 4 | 2 | 12.57 | 6.28 | 2 | 1.3 |

In other embodiments, the pipe 22 is arranged in the center of the cover 14 and communicated with the sealant outlet 18. The pipe 22 is arranged along the longitudinal axis of the cover, and the sealant outlet 18 is transverse to the longitudinal axis. In yet other embodiments, the gas inlet 16 extends inward to offset from the center of the cover 14 (i.e., the longitudinal axis) for a certain distance, thus communicating with the internal space 12. The internal space 12 surrounds the pipe 22 located in the center of the cover 14. In such embodiments, the gas inlet 16 is integrated with the cover. The gas inlet 16 can also be integrated with the container 13, such as being arranged on the top of the container 13, so as to be communicated with the internal space 12.

When in use, the gas inlet 16 of the sealant bottle is connected to the air compressor through a tube. The sealant outlet 18 of the sealant bottle is connected with a feeding tube not shown. FIG. 1 shows a positioning part 32 for fixing the feeding tube. The feeding tube is connected to the valve core of the tire. The air compressor injects air into the sealant bottle, so at this time, there is a great pressure in the sealant bottle. The air compresses the sealant in the sealant bottle to force it to enter the pipe 22. At the same time, the air can enter the pipe 22 through the gas lead-in part 26, and mix with the sealant in the pipe 22 to form the sealant foam.

Although the specific embodiments of the present application have been illustrated and described in detail to explain the principle of the present application, it should be understood, however, that the present application can be implemented in other ways without departing from the principle.

The invention claimed is:

1. A sealant bottle, comprising:
a bottle body defining an internal space for storing sealant, and having:
a gas inlet in fluid communication with the internal space to allow gas to enter the internal space;
a pipe for receiving the sealant, at least a portion of which is arranged in the internal space to allow the sealant to enter the pipe; and
a sealant outlet communicated with the pipe;
wherein the pipe defines a sealant delivery path to the sealant outlet, the pipe is further provided with a gas lead-in part on the sealant delivery path, and the gas lead-in part is configured such that the gas from the internal space enters the pipe through the gas lead-in part to mix with the sealant on the sealant delivery path,
wherein the gas lead-in part comprises at least one eyelet arranged on the pipe and capable of communicating with and between the internal space and an inside of the pipe,
wherein the pipe has a sealant-passage section defined by a cross section of the pipe,
wherein the at least one eyelet has a gas-passage section, and
wherein a ratio of an area of the sealant-passage section to a sum of an area of the gas-passage section of the at least one eyelet is in the range of 32-89.

2. The sealant bottle according to claim 1, wherein the bottle body comprises a container and a cover in sealed connection with the container, and wherein the gas lead-in part is arranged on one portion of the pipe located inside the container, and/or on another portion of pipe located inside the cover.

3. The sealant bottle according to claim 1, wherein the at least one eyelet is arranged on a circumferential side of the pipe.

4. The sealant bottle according to claim 2, wherein the gas inlet and the sealant outlet are arranged on the cover.

5. The sealant bottle according to claim 1, wherein the one portion of the pipe inside the container is a pipe made of flexible material, and the pipe is provided with a sealant receiver at a bottom of the bottle body to allow the sealant to enter the pipe from the bottom.

6. The sealant bottle according to claim 1, further comprising a positioning part adapted to fix a feeding.

7. The sealant bottle according to claim 1, wherein the at least one eyelet comprises two eyelets and the two eyelets are respectively arranged on opposite circumferential sides of the pipe.

8. The sealant bottle according to claim 1, wherein the at least one eyelet comprises three or more eyelets and the three or more eyelets are arranged around the pipe.

* * * * *